United States Patent
Kakuta

(10) Patent No.: US 9,963,315 B2
(45) Date of Patent: May 8, 2018

(54) SHEET CONVEYING APPARATUS AND IMAGE READING APPARATUS

(71) Applicant: KYOCERA Document Solutions Inc., Osaka-shi, Osaka (JP)

(72) Inventor: Masayuki Kakuta, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/461,383

(22) Filed: Mar. 16, 2017

(65) Prior Publication Data

US 2017/0279993 A1 Sep. 28, 2017

(30) Foreign Application Priority Data

Mar. 28, 2016 (JP) .................. 2016-063122

(51) Int. Cl.
*B65H 39/10* (2006.01)
*B65H 29/58* (2006.01)
(Continued)

(52) U.S. Cl.
CPC ............. *B65H 29/58* (2013.01); *B65H 5/062* (2013.01); *B65H 5/36* (2013.01); *B65H 9/06* (2013.01); *B65H 15/00* (2013.01); *B65H 29/60* (2013.01); *B65H 85/00* (2013.01); *H04N 1/00602* (2013.01); *H04N 1/00612* (2013.01); *H04N 1/00615* (2013.01); *H04N 1/00795* (2013.01); *B65H 2301/33312* (2013.01);
(Continued)

(58) Field of Classification Search
CPC . B65H 5/062; B65H 5/26; B65H 5/36; B65H 15/00; B65H 29/58; B65H 29/60; B65H 85/00; B65H 2301/333; B65H 2301/33312; B65H 2404/63; B65H 2404/632; H04N 1/00612
USPC .................................. 271/301, 303
See application file for complete search history.

(56) References Cited

U.S. PATENT DOCUMENTS 5,028,046 A * 7/1991 Kuwahara ............. B65H 29/58
271/301
7,578,504 B2 * 8/2009 Tsai ....................... B65H 29/58
271/184
(Continued)

FOREIGN PATENT DOCUMENTS

JP         2002111956 A      4/2002

*Primary Examiner* — Prasad V Gokhale
(74) *Attorney, Agent, or Firm* — Alleman Hall Creasman & Tuttle LLP

(57) ABSTRACT

A first sheet conveying path extends from a sheet supply portion toward a sheet discharge portion. A second sheet conveying path extends, from a diverging position in the first sheet conveying path, toward a switch-to-back portion. A third sheet conveying path is a conveying path for the sheet that is reversed by the switch-to-back portion. A first movable guiding portion is rotatable between a first posture in which the sheet that has reached the diverging position is guided toward the sheet discharge portion, and a second posture in which the sheet is guided into the second conveying path. A second movable guiding portion is rotatable between a third posture and a fourth posture, in the second sheet conveying path. In the third posture, the second sheet conveying path is formed in conjunction with the first movable guiding portion. In the fourth posture, the third sheet conveying path is formed.

11 Claims, 10 Drawing Sheets

(51) Int. Cl.
*H04N 1/00* (2006.01)
*B65H 5/06* (2006.01)
*B65H 9/06* (2006.01)
*B65H 15/00* (2006.01)
*B65H 5/36* (2006.01)
*B65H 29/60* (2006.01)
*B65H 85/00* (2006.01)

(52) U.S. Cl.
CPC ...... *B65H 2404/63* (2013.01); *B65H 2801/39* (2013.01); *H04N 2201/0081* (2013.01)

(56) References Cited

U.S. PATENT DOCUMENTS

| | | | |
|---|---|---|---|
| 7,802,786 B2* | 9/2010 | Tsai | B65H 29/58 271/184 |
| 8,113,500 B2* | 2/2012 | Tsai | B65H 29/58 271/184 |
| 2008/0067736 A1* | 3/2008 | Tsai | B65H 29/58 271/186 |
| 2010/0097668 A1* | 4/2010 | Chung | H04N 1/00567 358/498 |
| 2011/0109038 A1* | 5/2011 | Nishizawa | B65H 5/26 271/226 |

* cited by examiner

SHEET CONVEYING APPARATUS AND IMAGE READING APPARATUS

INCORPORATION BY REFERENCE

This application is based upon and claims the benefit of priority from the corresponding Japanese Patent Application No. 2016-063122 filed on Mar. 28, 2016, the entire contents of which are incorporated herein by reference.

BACKGROUND

The present disclosure relates to a sheet conveying apparatus and an image reading apparatus having the same.

In general, an image reading apparatus includes a sheet conveying apparatus called an ADF (Auto Document Feeder). In a case where the image reading apparatus reads an image from a sheet, the sheet conveying apparatus feeds the sheet from a feeding tray, and further conveys the sheet along a first sheet conveying path in one direction, and discharges the sheet onto a discharge tray. The image reading apparatus reads an image from the sheet that is being moved in the first sheet conveying path.

Further, in a case where the image reading apparatus reads images from both sides of the sheet, the sheet conveying apparatus conveys the sheet from which an image on one side has been read, such that the sheet is conveyed along a second sheet conveying path from a diverging position in the first sheet conveying path, and further the sheet is conveyed in the opposite direction in the second sheet conveying path, and the sheet is thereafter conveyed along the first sheet conveying path again.

SUMMARY

A sheet conveying apparatus according to one aspect of the present disclosure includes: support members; a sheet supply portion; a sheet discharge portion; a switch-to-back portion; a first sheet conveying path; a second sheet conveying path; a third sheet conveying path; a first movable guiding portion; and a second movable guiding portion. A sheet is fed from the sheet supply portion. The sheet is discharged into the sheet discharge portion. The switch-to-back portion is configured to reverse a sheet conveying direction of the sheet being conveyed. The first sheet conveying path is a conveying path where the sheet is conveyed from the sheet supply portion toward the sheet discharge portion. The second sheet conveying path is a conveying path which connects with the switch-to-back portion and a first diverging position in the first sheet conveying path, and in which the sheet is conveyed from the first diverging position toward the switch-to-back portion. The third sheet conveying path is a conveying path for the sheet that is reversed and conveyed by the switch-to-back portion, and reaches a merging position that is closer to the sheet discharge portion than the first diverging position in the first sheet conveying path is. The first movable guiding portion has both end portions in a width direction orthogonal to the sheet conveying direction, the both end portions being rotatably supported by the support members, and the first movable guiding portion is configured to be rotatable between a first posture and a second posture. The first movable guiding portion in the first posture guides the sheet that has been conveyed along the first sheet conveying path, at the first diverging position, toward the sheet discharge portion. The first movable guiding portion in the second posture guides, into the second sheet conveying path, the sheet that has been conveyed along the first sheet conveying path. The second movable guiding portion has both end portions, in the width direction, which are rotatably supported by the first movable guiding portion, and is configured to be rotatable between a third posture and a fourth posture. The second movable guiding portion in the third posture forms, at a second diverging position in the second sheet conveying path, the second sheet conveying path, in conjunction with the first movable guiding portion in the second posture. The second movable guiding portion in the fourth posture forms the third sheet conveying path at the second diverging position.

An image reading apparatus according to another aspect of the present disclosure includes the sheet conveying apparatus; and an image reading portion configured to read an image from a sheet conveyed by the sheet conveying apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
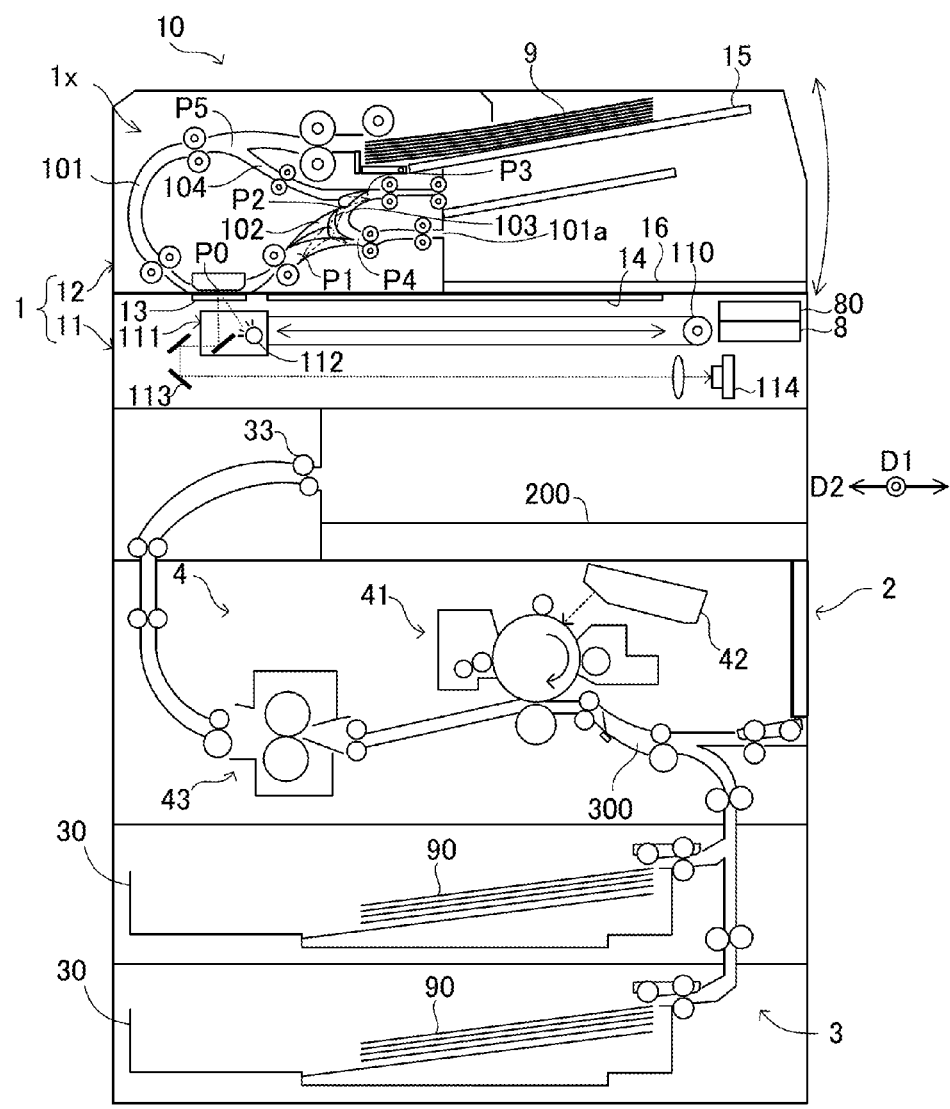
FIG. 1 illustrates a configuration of an image processing apparatus that includes an ADF according to an embodiment.

Hereinafter, an embodiment of the present disclosure will be described with reference to the accompanying drawings. The following embodiment is an example embodying the present disclosure and, by nature, does not limit the technical scope of the present disclosure.

[Image Processing Apparatus 10]

Firstly, a configuration of an image processing apparatus 10 having an ADF 1x according to an embodiment will be described with reference to FIG. 1. The ADF 1x is a device that feeds and conveys a document 9. The document 9 is an example of a sheet having an image thereon. The ADF 1x is an example of a sheet conveying apparatus that feeds and conveys the sheet.

The image processing apparatus 10 includes an image reading device 1 having the ADF (Auto Document Feeder) 1x, and an image forming device 2. A control portion 8 and an operation display portion 80 included in the image reading device 1 are also a part of the image forming device 2.

The image processing apparatus 10 is, for example, a copying machine, a printer or a facsimile having a function of a copying machine, or a multifunction peripheral that has a plurality of image processing functions including an image reading function.

[Image Reading Device 1]

The image reading device 1 reads an image of the document 9 and outputs data of the read document image.

As shown in FIG. 1, the image reading device 1 includes an image reading portion 11 and a movable cover 12. The ADF 1x is incorporated in the movable cover 12. The image reading portion 11 includes a first contact glass 13 and a second contact glass 14.

The first contact glass 13 is a transparent panel disposed at a reading position P0. The image reading portion 11 reads an image from the document 9 that is conveyed by the ADF 1x and is passing through the reading position P0.

The second contact glass 14 is a transparent panel on which the document 9 is placed. The movable cover 12 is supported so as to be pivotable, relative to the image reading portion 11, between a closing position and an opening position. The movable cover 12 covers the top surface of each of the first contact glass 13 and the second contact glass 14 at the closing position, and opens the top surface of each of the first contact glass 13 and the second contact glass 14 at the opening position.

The image reading portion 11 includes a movement mechanism 110, a movement unit 111 including a light emitting portion 112, an optical system 113 such as a mirror and a lens, an image sensor 114, and the like.

The light emitting portion 112 is a light source that applies light in the form of a band along a main scanning direction D1, through the first contact glass 13 or the second contact glass 14, to the document 9. In the following description, a direction orthogonal to the main scanning direction D1 is referred to as a sub-scanning direction D2.

The optical system 113 includes, for example, a mirror and a lens that guide reflected light of light applied from the light emitting portion 112 to the document 9, to a light reception portion of the image sensor 114. The image sensor 114 outputs, as image data, data representing a light amount of the light reflected by the document 9.

The movement unit 111 integrally supports the light emitting portion 112 and a part of the optical system 113. When the image reading portion 11 reads an image of the document 9 placed on the second contact glass 14, the movement mechanism 110 moves the movement unit 111 along the sub-scanning direction D2.

Meanwhile, when the image reading portion 11 reads an image of the document 9 conveyed by the ADF 1x, the movement mechanism 110 causes the movement unit 111 to be fixed at a position opposing the reading position P0.

A CIS (Contact Image Sensor) may be used for the image reading portion 11. In this case, the CIS is supported by the movement unit 111. The CIS is an image sensor in which the light emitting portion 112, the image sensor 114, and a lens are integrated.

The ADF 1x is a device that feeds, one by one, the documents 9 placed on a feeding tray 15, and conveys the document 9 in a first conveying path 101 into a discharge tray 16. The first conveying path 101 is a conveying path through which the document 9 is conveyed from the feeding tray 15 into the discharge tray 16. The image reading portion 11 reads an image from the document 9 that is passing through the reading position P0 in the first conveying path 101. The ADF 1x will be described below in detail. The feeding tray 15 and the tray 15 discharge tray 16 are an example of a sheet supply portion that is a feed source from which the document 9 is fed and an example of a sheet discharge portion that is a destination into which the document 9 is discharged, respectively.

[Image Forming Device 2]

The image forming device 2 forms, on an output sheet 90, an image based on the image data outputted from the image reading device 1. The output sheet 90 is a sheet-like medium, such as paper and an OHP sheet, on which an image is to be formed.

For example, the image forming device 2 includes a sheet conveying portion 3 and an image forming portion 4. The image forming portion 4 includes an image forming unit 41, a laser scanning unit 42, a fixing unit 43, and the like. The image forming portion 4 shown in FIG. 1 is an electrophotographic type device. Another type of the image forming portion 4 such as an inkjet type image forming portion may be used.

The sheet conveying portion 3 feeds the output sheet 90 from a sheet storage portion 30 into an output sheet conveying path 300 such that the output sheet 90 is conveyed along the output sheet conveying path 300, and discharged through an outlet of the output sheet conveying path 300 onto an output sheet discharge tray 200.

The image forming portion 4 forms an image on a surface of the output sheet 90 that is being moved in the output sheet conveying path 300. The image forming portion 4 executes an image forming process according to electrophotography by using a known configuration, whereby a toner image is formed on the output sheet 90 that is being moved in the output sheet conveying path 300.

The image forming unit 41 has known components such as a charging portion, a developing portion, and a transfer portion, in addition to a photosensitive member onto which an electrostatic latent image is formed by the laser scanning unit 42. The fixing unit 43 heats the toner image transferred to the output sheet 90 to fix the image onto the output sheet 90.

The operation display portion 80 is a user interface that has an operation portion and a display portion. The control portion 8 outputs, to the operation display portion 80, an operation screen such as a screen for selecting a both-side mode, and further controls various electric devices of the image processing apparatus 10 according to an operation on the operation screen.

[ADF 1x]

Figure 2:
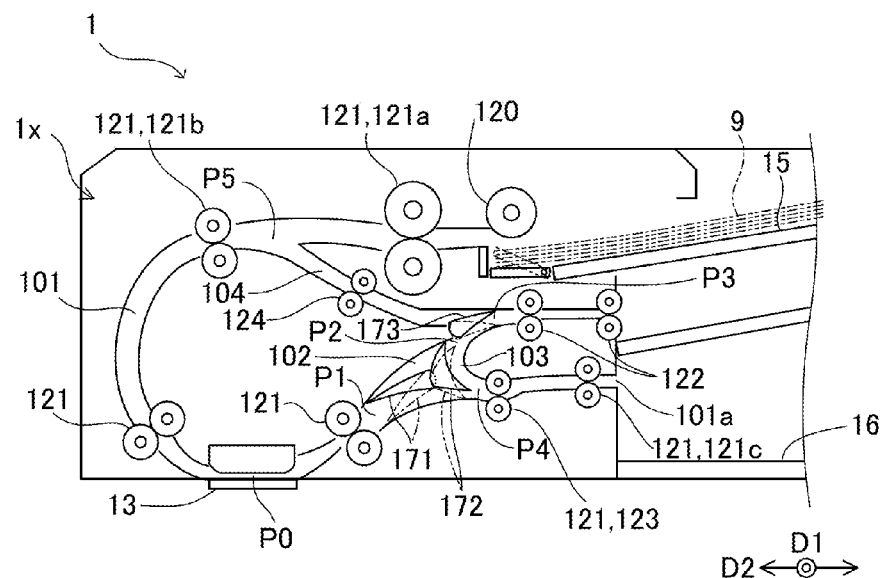
FIG. 2 illustrates a configuration of the ADF according to the embodiment.

As shown in FIGS. 1, 2, the ADF 1x has a second conveying path 102, a third conveying path 103, and a fourth conveying path 104 formed therein, in addition to the first conveying path 101.

The second conveying path 102 is a sheet conveying path that diverges at a first diverging position P1 in the first conveying path 101. The third conveying path 103 is a sheet conveying path that diverges at a second diverging position P2 in the second conveying path 102. The third conveying path 103 merges at a first merging position P4 in the first conveying path 101.

Further, the fourth conveying path 104 is a conveying path for the document 9 that is reversed and conveyed by a second conveying roller pair 122, and the fourth conveying path 104 merges at a second merging position P5 in the first conveying path 101. The fourth conveying path 104 extends from a third diverging position P3 in the second conveying path 102 up to the second merging position P5 in the first conveying path 101. That is, the fourth conveying path 104 diverges at the third diverging position P3 from the second conveying roller pair 122 and reaches the second merging position P5.

The first diverging position P1 is a position downstream of the reading position P0 in the first conveying path 101 in the direction in which the document 9 is conveyed. The first merging position P4 is closer to the discharge tray 16 than the first diverging position P1 in the first conveying path 101 is.

The second merging position P5 is closer to the feeding tray 15 than the first diverging position P1 and the reading position P0 in the first conveying path 101 are. In the second conveying path 102, the second diverging position P2 is closer to the first diverging position P1 than the third diverging position P3 is.

The first conveying path 101, the second conveying path 102, the third conveying path 103, and the fourth conveying path 104 are examples of a first sheet conveying path, a second sheet conveying path, a third sheet conveying path, and a fourth sheet conveying path, respectively.

As shown in FIG. 2, the ADF 1x includes a pickup roller 120, a feed roller pair 121a, and a discharge roller pair 121c. The pickup roller 120 and the feed roller pair 121a feed the documents 9 placed on the feeding tray 15, one by one, into the first conveying path 101. The discharge roller pair 121c discharges the document 9, through a discharge outlet 101a that is an outlet of the first conveying path 101, onto the discharge tray 16.

The ADF 1x includes a plurality of first conveying roller pairs 121 that convey the document 9 along the first conveying path 101 in one direction. The plurality of first conveying roller pairs 121 include a registration roller pair 121b. The first conveying roller pairs 121 each represent an example of a first conveying portion. The first conveying roller pair 121 positioned closest to the downstream end in the first conveying path 101 is the discharge roller pair 121c.

Further, the first conveying roller pair 121 positioned adjacent to the first merging position P4 in the first conveying path 101 on the downstream side doubles as a third conveying roller pair 123 that conveys the document 9 along the third conveying path 103. The third conveying roller pair 123 conveys the document 9 along the third conveying path 103 from the second diverging position P2 side toward the first merging position P4. The third conveying roller pair 123 is an example of a third conveying portion.

Further, the ADF 1x includes the second conveying roller pair 122 that allows the document 9 to be conveyed in the forward direction from the first diverging position P1 side along the second conveying path 102, and in the direction opposite to the forward direction. The second conveying roller pair 122 is an example of a switch-to-back portion capable of reversing the direction in which the document 9 is conveyed. The third diverging position P3 is a position between the second conveying roller pair 122 and the second diverging position P2 in the second conveying path 102. In the example shown in FIG. 2, the ADF 1x includes the two second conveying roller pairs 122. The two second conveying roller pairs 122 represent an example of a second conveying portion.

The forward direction represents a direction from the first diverging position P1 side toward the second conveying roller pairs 122, in the second conveying path 102. Therefore, the third diverging position P3 is a position downstream of the second diverging position P2 in the second conveying path 102 in the forward direction. The forward direction and the opposite direction correspond to a first direction and a second direction, respectively, in the second conveying path 102.

Moreover, the ADF 1x includes a fourth conveying roller pair 124 that conveys, along the fourth conveying path 104, the document 9 conveyed in the opposite direction by the second conveying roller pairs 122. The fourth conveying roller pair 124 conveys the document 9 along the fourth conveying path 104 from the third diverging position P3 side toward the second merging position P5. The fourth conveying roller pair 124 is an example of a fourth conveying portion.

The second conveying path 102 connects with the first diverging position P1 and the second conveying roller pair 122. The second conveying path 102 is a conveying path for the document 9 conveyed from the first diverging position P1 in the forward direction, and the document 9 conveyed in the opposite direction by the second conveying roller pairs 122.

Further, the third conveying path 103 is a conveying path for the document 9 conveyed in the opposite direction by the second conveying roller pairs 122.

Furthermore, the ADF 1x includes a first movable guiding portion 171, a second movable guiding portion 172, and a third movable guiding portion 173.

The first movable guiding portion 171 is a member that has its end portion positioned at the first diverging position P1 and that is supported so as to be rotatable between a first posture and a second posture. The first movable guiding portion 171 in the first posture guides the document 9 that has been conveyed along the first conveying path 101 to the first diverging position P1 so as to continuously convey the document 9 along the first conveying path 101 toward the discharge tray 16 (see FIG. 9). In FIG. 2, the first movable guiding portion 171 in the first posture is represented by a solid line.

Figure 10:
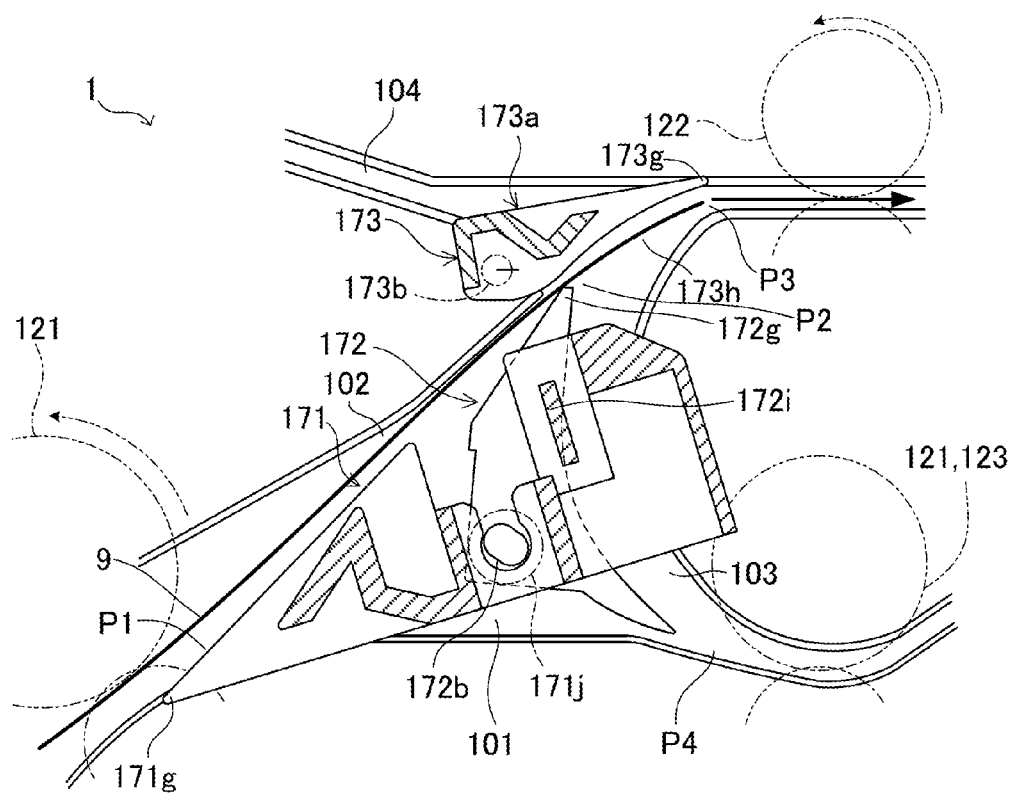
FIG. 10 is a cross-sectional view of the main portion, in a second conveying state, of the ADF according to the embodiment.

Meanwhile, the first movable guiding portion 171 in the second posture guides, into the second conveying path 102, the document 9 that has been conveyed along the first conveying path 101 to the first diverging position P1 (see FIG. 10). In FIG. 2, the first movable guiding portion 171 in the second posture is represented by an imaginary line (alternate long and two short dashes line).

The second movable guiding portion 172 is a member that has its end portion positioned at the second diverging position P2 and that is supported so as to be rotatable between a third posture and a fourth posture. The second movable guiding portion 172 in the third posture opens a path for the document 9 that is conveyed from the first diverging position P1 in the forward direction by the second conveying roller pairs 122 (see FIG. 10). That is, the second movable guiding portion 172 in the third posture forms the second conveying path 102 in conjunction with the first movable guiding portion 171 having been rotated into the second posture. Thus, the second movable guiding portion 172 in the third posture guides the document 9 conveyed in the forward direction, toward the second conveying roller pairs 122, at the second diverging position P2, in conjunction with the first movable guiding portion 171. In FIG. 2, the second movable guiding portion 172 in the third posture is represented by an imaginary line.

Figure 12:
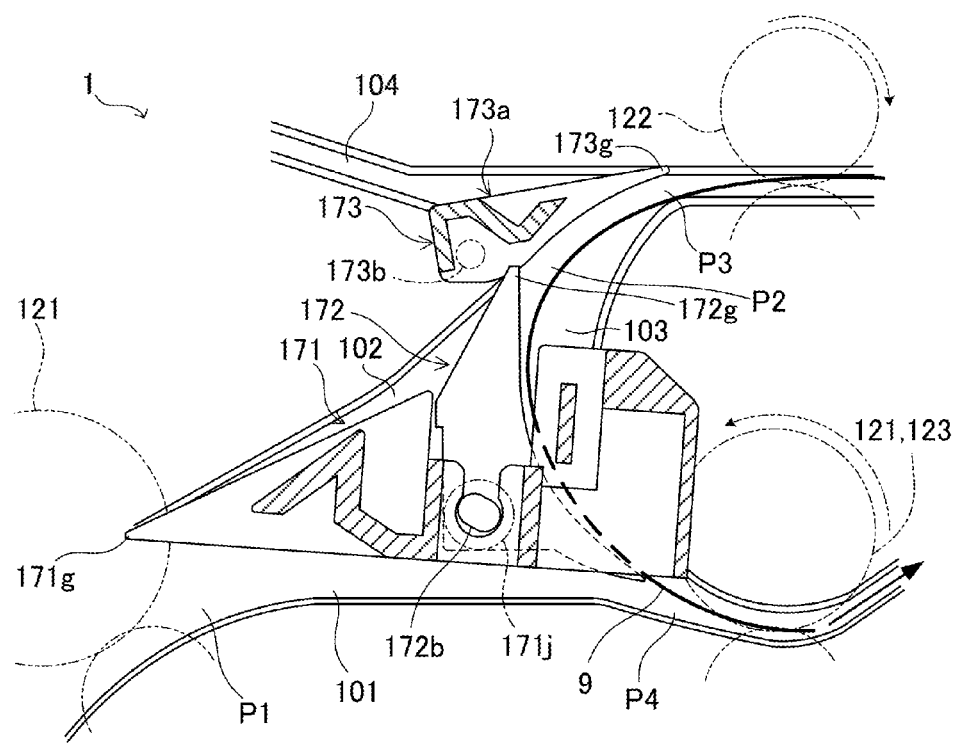
FIG. 12 is a cross-sectional view of the main portion, in a fourth conveying state, of the ADF according to the embodiment.

Meanwhile, the second movable guiding portion 172 in the fourth posture closes the second conveying path 102, and guides the document 9 that is reversed and conveyed in the opposite direction by the second conveying roller pairs 122 after the document 9 has passed through the second diverging position P2 in the forward direction, at the second diverging position P2, into the third conveying path 103 (see FIG. 12). In FIG. 2, the second movable guiding portion 172 in the fourth posture is represented by a solid line.

When the second movable guiding portion 172 is in the fourth posture, the posture of the first movable guiding portion 171 is not limited to any specific posture. In the examples shown in FIGS. 9, 11, when the second movable guiding portion 172 is in the fourth posture, the first movable guiding portion 171 is in the first posture. Meanwhile, when the second movable guiding portion 172 is in the fourth posture, the first movable guiding portion 171 may be in the second posture. In this case, the document 9 that has reached the first diverging position P1 for the following time, is immediately guided into the second conveying path 102.

The third movable guiding portion 173 is disposed between the second movable guiding portion 172 and the third diverging position P3. The third movable guiding portion 173 is a member that has its end portion positioned at the third diverging position P3 and that is supported so as to be rotatable between a fifth posture and a sixth posture. The third movable guiding portion 173 in the fifth posture opens a path for the document 9 conveyed from the first diverging position P1 in the forward direction by the second conveying roller pairs 122 (see FIG. 10). That is, the third movable guiding portion 173 in the fifth posture forms the second conveying path 102 in conjunction with the first movable guiding portion 171 and the second movable guiding portion 172. The third movable guiding portion 173 in the fifth posture connects the second conveying path 102 and the second conveying roller pair 122 portion with each other. Further, the third movable guiding portion 173 in the fifth posture guides, to the second conveying roller pairs 122, the document 9 conveyed from the first diverging position P1. In FIG. 2, the third movable guiding portion 173 in the fifth posture is represented by a solid line.

Figure 11:
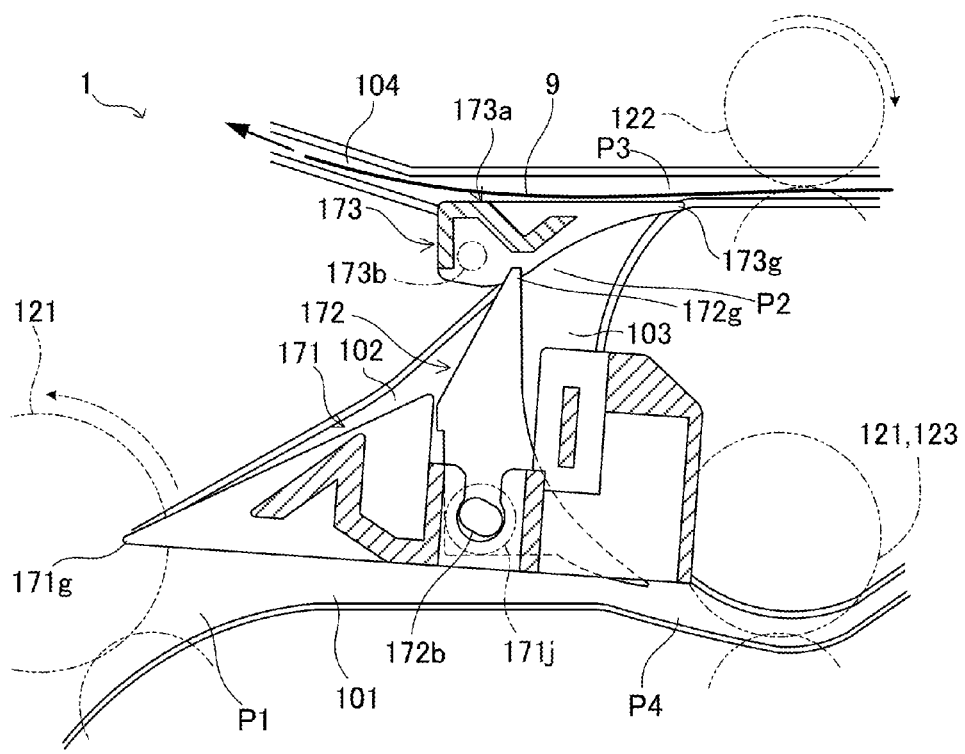
FIG. 11 is a cross-sectional view of the main portion, in a third conveying state, of the ADF according to the embodiment.

Meanwhile, the third movable guiding portion 173 in the sixth posture closes the second conveying path 102, and guides, into the fourth conveying path 104, the document 9 that is reversed and conveyed in the opposite direction by the second conveying roller pairs 122 after the document 9 has passed through the third diverging position P3 in the forward direction (see FIG. 11). The third movable guiding portion 173 in the sixth posture connects the second conveying roller pair 122 portion and the fourth conveying path 104 with each other. In FIG. 2, the third movable guiding portion 173 in the sixth posture is represented by an imaginary line.

In a one-side reading mode in which the image reading portion 11 reads an image on only one of the sides of the document 9, the ADF 1x conveys the document 9 in a first conveying pattern. In the first conveying pattern, the ADF 1x conveys the document 9 fed from the feeding tray 15, along the first conveying path 101, and discharges the document 9 as it is onto the discharge tray 16 (see FIG. 9). In the first conveying pattern, the document 9 passes through the reading position P0 only once.

In a both-side reading mode in which the image reading portion 11 reads images on both sides of the document 9, the ADF 1x conveys the document 9 in a second conveying pattern. In the second conveying pattern, the ADF 1x conveys the document 9 fed from the feeding tray 15, along the first conveying path 101, to the first diverging position P1, and subsequently conveys the document 9 from the first diverging position P1 into the second conveying path 102 (see FIG. 10).

Next, the ADF 1x reverses, in the second conveying path 102, the direction in which the document 9 is conveyed, and conveys, into the fourth conveying path 104, the document 9 from the third diverging position P3 in the second conveying path 102 (see FIG. 11). Subsequently, the ADF 1x conveys the document 9 from the second merging position P5 to the first diverging position P1 along the first conveying path 101 again.

Further, the ADF 1x conveys the document 9 from the first diverging position P1 into the second conveying path 102 again, and reverses, in the second conveying path 102, the direction in which the document 9 is conveyed. Further, the ADF 1x conveys the document 9 conveyed in the opposite direction along the second conveying path 102, from the second diverging position P2, into the third conveying path 103, and subsequently conveys the document 9 through the first merging position P4 into the first conveying path 101, and finally discharges the document 9 through the discharge outlet 101a onto the discharge tray 16 (see FIG. 12).

In the second conveying pattern, the document 9 passes through the reading position P0 twice such that, for the second time, the front face and the back face are reversed and the leading end in the conveying direction is reversed. Thereafter, the posture of the document 9 is further reversed, and the document 9 is discharged onto the discharge tray 16. Thus, the document 9 is discharged in the same posture onto the discharge tray 16 in the one-side reading mode and the both-side reading mode.

In the ADF 1x, the movable guiding portions 171 to 173 that allow the direction in which the document 9 is conveyed to be changed are disposed at the diverging positions P1 to P3, respectively, in the conveying paths 101, 102. In general, members, in a conventional device, corresponding to the movable guiding portions 171 to 173 are each rotatably supported by paired support members 12a disposed on both sides in the conveying paths 101 to 104 (see FIG. 3).

Figure 3:
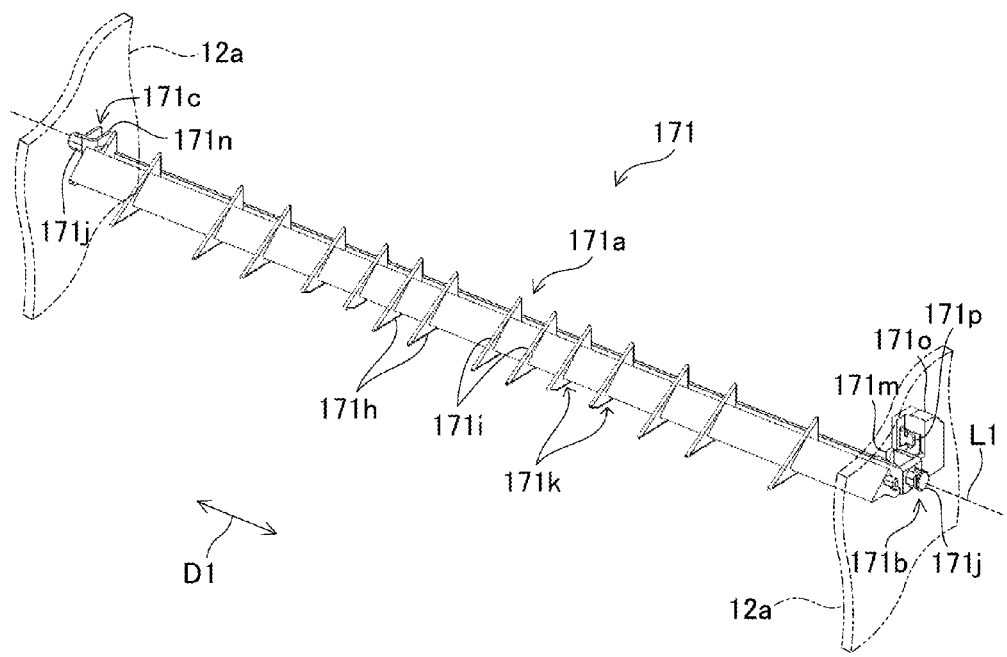
FIG. 3 is a first perspective view of a first movable guiding portion of the ADF according to the embodiment.
Figure 8:
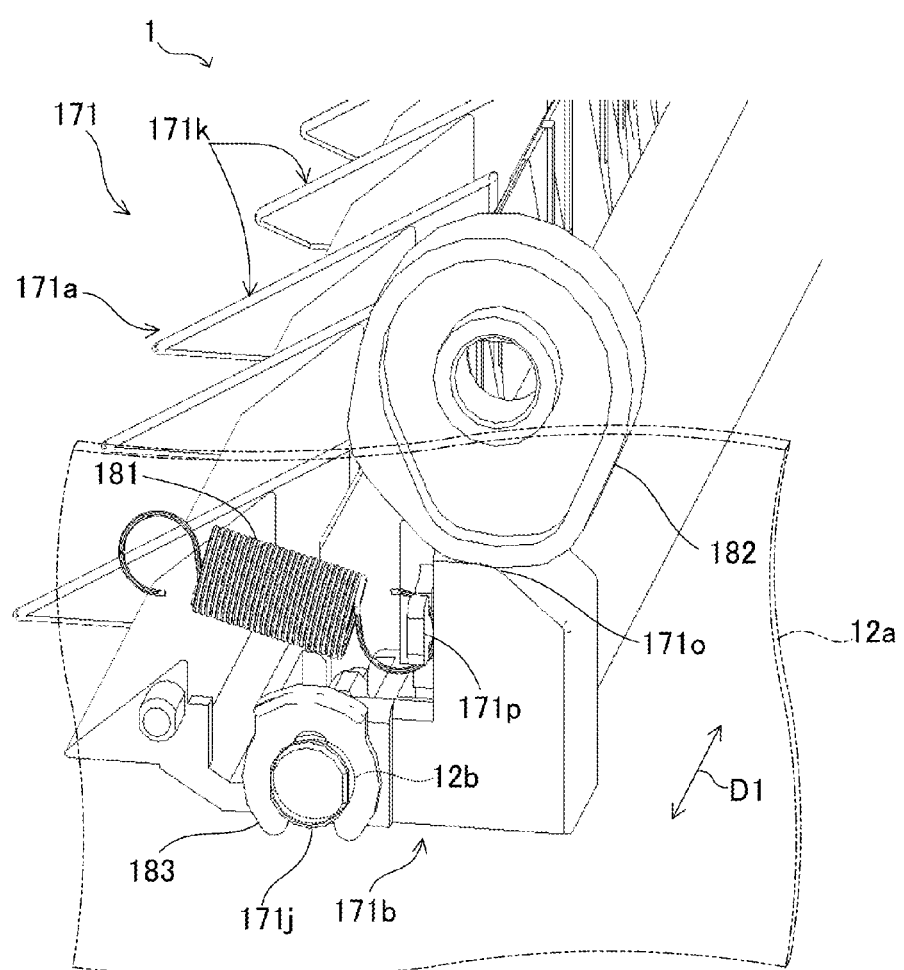
FIG. 8 is a perspective view of an end portion and a driving mechanism of the first movable guiding portion of the ADF according to the embodiment.

In FIGS. 3, 8, the paired support members 12a are represented by imaginary lines. The paired support members 12a are, for example, plate-like members that form frames of the ADF 1x, and are formed from a metal or a synthetic resin.

Recently, there are needs to arrange the plurality of the diverging positions P1 to P3 so as to be as close to each other as possible in order to reduce the size of the sheet conveying apparatus. However, if the needs are met, a problem arises that a plurality of members corresponding to the movable guiding portions 171 to 173 interfere with each other in portions supported by the paired support members 12a.

The ADF 1x has such a structure that the plurality of the movable guiding portions 171 to 173 for changing a direction in which the document 9 is conveyed, are prevented from interfering with each other if the diverging positions P1 to P3 in the conveying paths 101, 102 are close to each other, resulting in reduction of the size of the apparatus. Hereinafter, the structure will be described.

[Structures of Movable Guiding Portions 171, 172]

Figure 4:
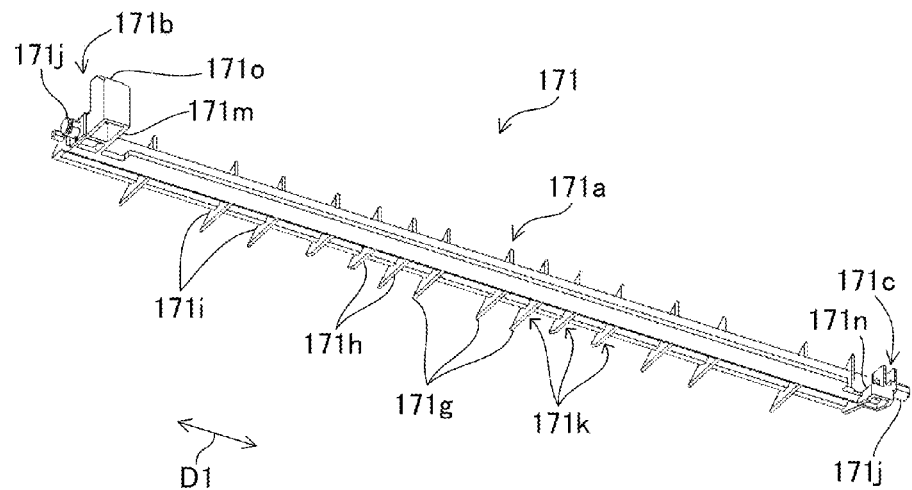
FIG. 4 is a second perspective view of the first movable guiding portion of the ADF according to the embodiment.

As shown in FIGS. 3, 4, the first movable guiding portion 171 has a first base portion 171a and paired extension portions 171b, 171c.

The first base portion 171a is formed so as to extend in the width direction of the first conveying path 101, and comes into contact with the document 9. The width direction of the first conveying path 101 is a direction along the main scanning direction D1. In the following description, the width direction of the first conveying path 101 is abbreviated as a width direction. The width direction is a direction orthogonal to the direction in which the document 9 (sheet) is conveyed.

The end portions of ribs 171k that have almost triangular shapes and are formed in the first base portion 171a are each a first path-changing portion 171g. The first path-changing portion 171g rotates at the first diverging position P1, to change the direction in which the document 9 is conveyed. The first path-changing portion 171g is the end portion of the first movable guiding portion 171.

Further, in each rib 171k of the first base portion 171a, one and the other of portions forming both sides that extend from the first path-changing portion 171g are a first guiding portion 171h and a second guiding portion 171i, respectively.

Figure 9:
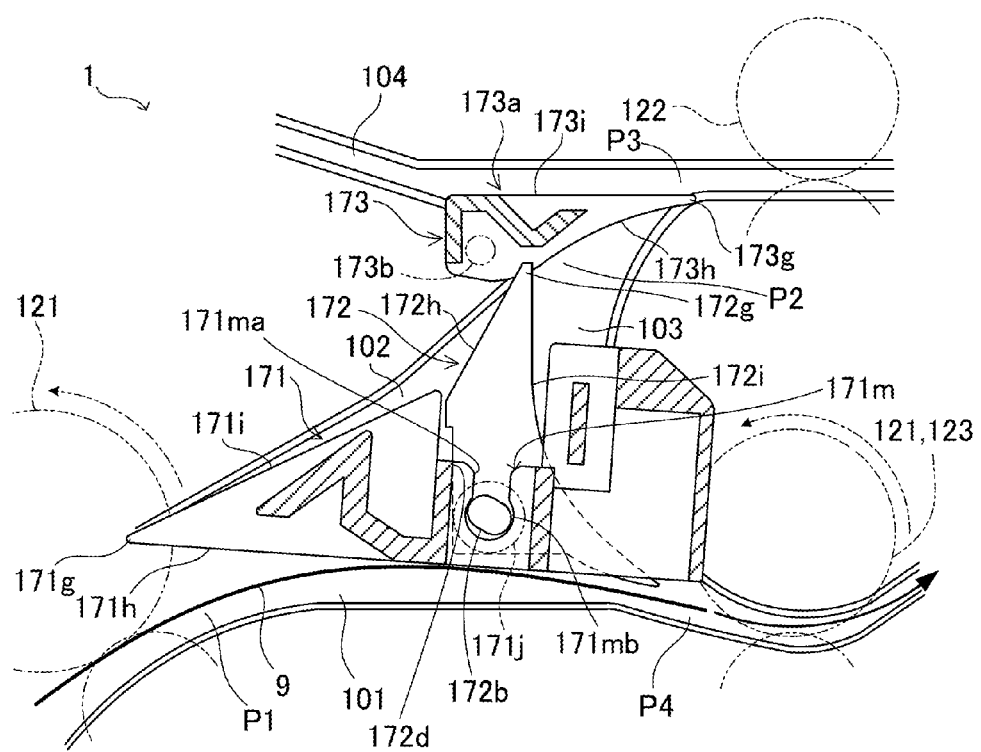
FIG. 9 is a cross-sectional view of a main portion, in a first conveying state, of the ADF according to the embodiment.

As shown in FIG. 9, the first guiding portion 171h guides, along the first conveying path 101, one surface of the document 9 that has passed through the first diverging position P1 along the first conveying path 101 in a state where the first movable guiding portion 171 is in the first posture. The first guiding portion 171h comes into contact with the one surface of the document 9 conveyed along the first conveying path 101.

As shown in FIG. 10, the second guiding portion 171i guides, along the second conveying path 102, one surface of the document 9 that has entered the second conveying path 102 through the first diverging position P1, in a state where the first movable guiding portion 171 is in the second posture. The second guiding portion 171i comes into contact with the one surface of the document 9 conveyed along the second conveying path 102.

As shown in FIGS. 3, 4, the paired extension portions 171b, 171c are formed so as to extend upright from both end portions of the first base portion 171a in the direction intersecting the width direction. For example, the paired extension portions 171b, 171c are formed so as to extend from the first base portion 171a in the direction orthogonal to the width direction. The width direction is also the longitudinal direction of the first base portion 171a.

The paired extension portions 171b, 171c have paired first pivots 171j formed along the main scanning direction D1 so as to be rotatably supported by the paired support members 12a, respectively. As shown in FIG. 3, the paired first pivots 171j are formed at both end portions, in the width direction, of the first movable guiding portion 171 so as to project outward. The first movable guiding portion 171 rotates about a center line L1 of each of the paired first pivots 171j. The paired extension portions 171b, 171c represent an example of a pair of side end portions provided on both ends, in the width direction, of the first base portion 171a.

The paired support members 12a have bearing portions 12b formed so as to support the paired first pivots 171j such that the paired first pivots 171j are rotatable (see FIG. 8). The first movable guiding portion 171 can rotate about the paired first pivots 171j.

The paired first pivots 171j are formed at the paired support members 12a, respectively, and, for example, paired openings supported by the paired first pivots 171j may be formed in the paired extension portions 171b, 171c, respectively.

As shown in FIG. 8, each first pivot 171j has a retaining member 183 for preventing the first pivot 171j from being removed from the bearing portion 12b.

Further, as shown in FIG. 8, one extension portion, i.e., the extension portions 171b has an engagement portion 170p that engages with one end of a first spring 181, and a cam contact portion 171o pressed by a cam 182. The other end of the first spring 181 engages with one of the paired support members 12a.

The first spring 181 is an example of an elastic member that prompts the first movable guiding portion 171 such that the first movable guiding portion 171 is in the second posture. The cam 182 is driven by a not-illustrated motor, and is half rotated for each operation while contacting with the cam contact portion 171o. Each time the cam 182 is half rotated, the first movable guiding portion 171 is switched between a state where the first movable guiding portion 171 is rotated from the second posture into the first posture by being pressed by the cam 182 and a state where the first movable guiding portion 171 is rotated from the first posture into the second posture by force of the first spring 181.

As described above, the first movable guiding portion 171 is supported by the paired support members 12a disposed on both sides in the width direction so as to be rotatable between the first posture and the second posture.

Figure 6:
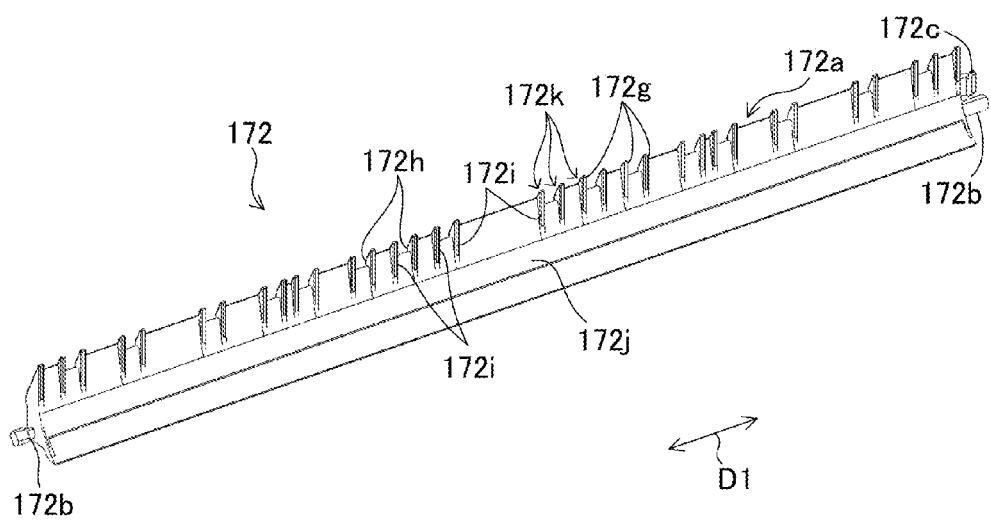
FIG. 6 is a second perspective view of the second movable guiding portion of the ADF according to the embodiment.
Figure 7:
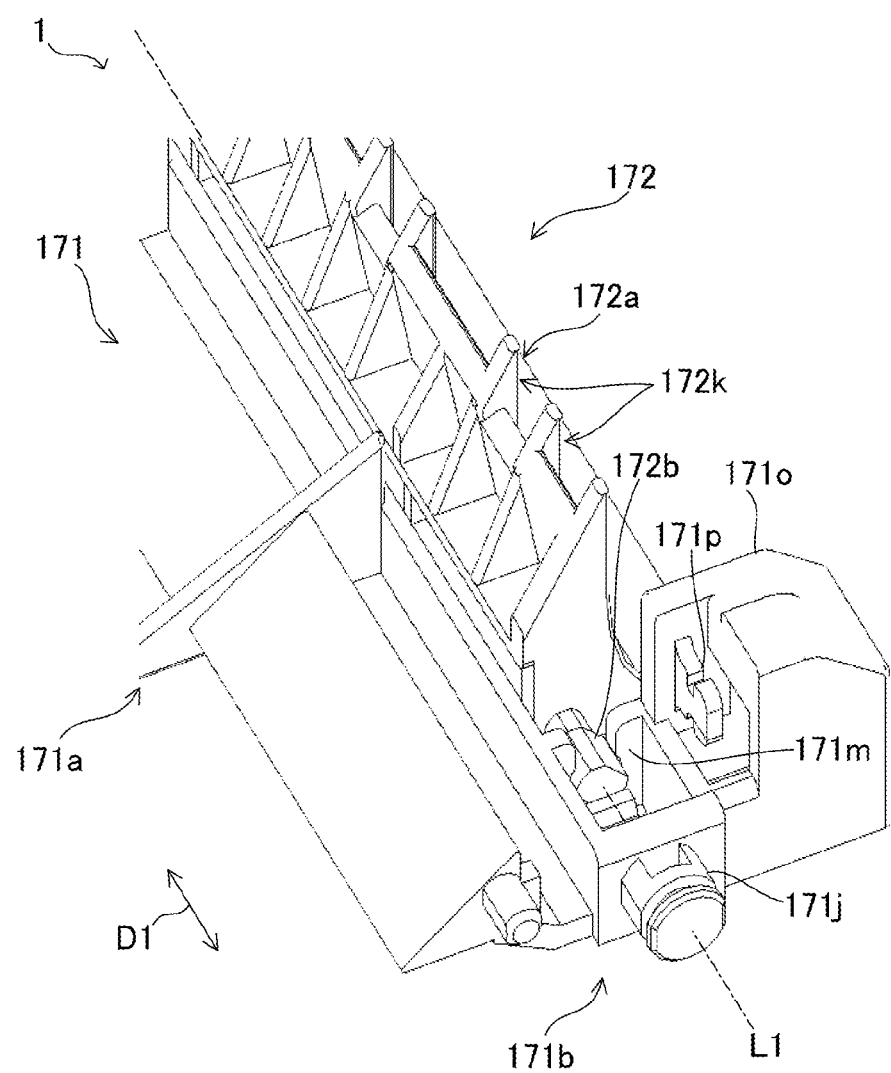
FIG. 7 is a perspective view of end portions of the first movable guiding portion and the second movable guiding portion of the ADF according to the embodiment.

Further, as shown in FIGS. 3, 4, 7, the paired extension portions 171b, 171c have paired bearing portions 171m, 171n, respectively, which support second pivots 172b of the second movable guiding portion 172 such that the second pivots 172b are rotatable. The paired bearing portions 171m, 171n are formed inside the paired extension portions 171b, 171c. The paired bearing portions 171m, 171n will be described below. The second pivots 172b are shown in FIGS. 5, 6, 7.

Figure 5:
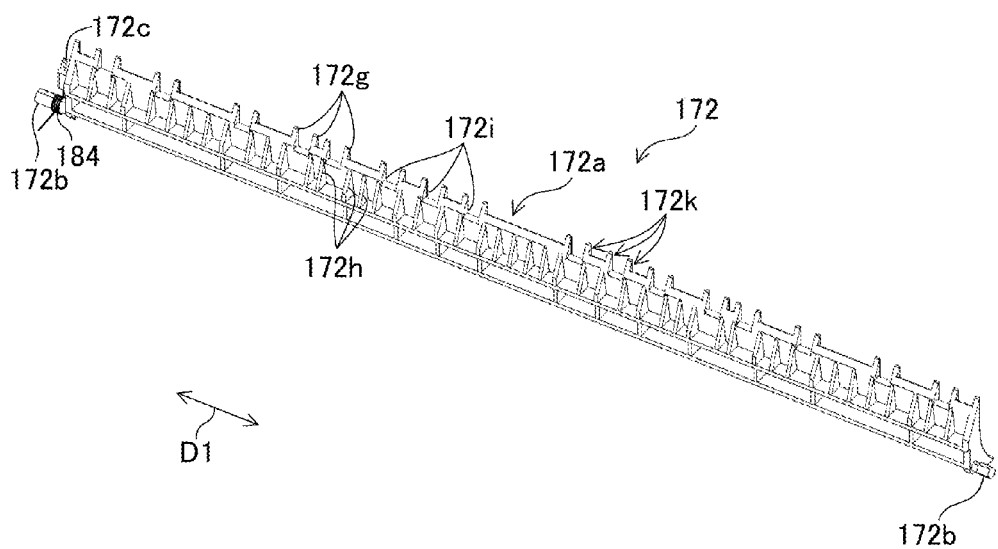
FIG. 5 is a first perspective view of a second movable guiding portion of the ADF according to the embodiment.

As shown in FIGS. 5, 6, the second movable guiding portion 172 includes a second base portion 172a and the paired second pivots 172b. As shown in FIG. 5, the paired second pivots 172b are disposed on both end portions, in the width direction, of the second movable guiding portion 172. The second base portion 172a extends in the width direction of the second conveying path 102, and comes into contact with the document 9. That is, the longitudinal direction of the second base portion 172a is the width direction of the second conveying path 102.

The width direction of the first conveying path 101 is similar to the width direction of the second conveying path 102, the width direction of the third conveying path 103, and the width direction of the fourth conveying path 104.

The end portions of ribs 172k formed in the second base portion 172a are each a second path changing portion 172g. The second path changing portion 172g rotates at the second diverging position P2 to change the direction in which the document 9 is conveyed. The second path changing portion 172g is the end portion of the second movable guiding portion 172.

Further, as shown in FIGS. 5, 9, the second base portion 172a also has third guiding portions 172h. Each third guiding portion 172h is tilted diagonally relative to the forward direction in the second conveying path 102, and, at the third guiding portion 172h, the end portion of the document 9 conveyed along the second conveying path 102 in the forward direction slides. The third guiding portion 172h guides one surface of the document 9 conveyed from the first diverging position P1, toward the second conveying roller pairs 122, in conjunction with each second guiding portion 171*i* of the first movable guiding portion 171, in a state where the second movable guiding portion 172 is in the third posture.

Further, a portion 172*i* that forms a side continuous with the second path changing portion 172*g* in each rib 172*k* formed in the second base portion 172*a*, and a surface 172*j* continuous with the portion 172*i* are fourth guiding portions 172*i*, 172*j*, respectively The fourth guiding portions 172*i*, 172*j* guide, along the third conveying path 103, one surface of the document 9 that is reversed and conveyed in the opposite direction after the document 9 has passed through the second diverging position P2 in the forward direction, in a state where the second movable guiding portion 172 is in the fourth posture (see FIG. 12). The fourth guiding portions 172*i*, 172*j* come into contact with the one surface of the document 9 that is conveyed along the third conveying path 103.

The paired second pivots 172*b* are rotatably supported by the paired bearing portions 171*m*, 171*n*. The paired second pivots 172*b* are formed so as to project bi-directionally toward the outside from both end portions of the second base portion 172*a*. As described above, the paired bearing portions 171*m*, 171*n* are formed in the paired extension portions 171*b*, 171*c*, respectively.

One of the second pivots 172*b* is inserted into a hole formed by a corresponding one of bearing portions, e.g., the bearing portion 171*n*, along the axial direction of the second pivot 172*b* (not shown). The axial direction of the paired second pivots 172*b* is the longitudinal direction of the second base portion 172*a*.

As shown in FIGS. 7, 9, the bearing portion 171*m* has a pivot hole portion 171*mb* for holding the second pivot 172*b*, and a slit 171*ma* that is in communication with the pivot hole portion 171*mb*. The second pivot 172*b* is inserted through the slit 171*ma* from thereabove into the pivot hole portion 171*mb*. At the pivot hole portion 171*mb*, a through hole into which the second pivot 172*b* is inserted is formed.

As shown in FIG. 9, in the bearing portion 171*m*, the width of the slit 171*ma* on the upper side is less than the width of the pivot hole portion 171*mb* on the lower side. Further, the second pivot 172*b* has a flattened shape as viewed in the axial direction.

The width, in the major diameter direction, of the second pivot 172*b* as viewed in the axial direction thereof is greater than the width of the slit 171*ma* and is less than the width of the pivot hole portion 171*mb*. Further, the width, in the minor diameter direction, of the second pivot 172*b* as viewed in the axial direction thereof is less than the width of the slit 171*ma*.

Therefore, the second pivot 172*b* having the flattened shape is inserted through the slit 171*ma* into the pivot hole portion 171*mb* along the longitudinal direction as viewed in the axial direction, and is thereafter rotated into a different posture. Thus, the second pivot 172*b* can be easily inserted into the bearing portion 171*m*, and the second pivot 172*b* is less likely to be removed from the bearing portion 171*m*.

Further, the first movable guiding portion 171 and the second movable guiding portion 172 are combined to form one unit. Therefore, when the first movable guiding portion 171 and the second movable guiding portion 172 are mounted to the ADF 1*x*, the number of components to be handled can be reduced.

As shown in FIG. 7, in a state where the first movable guiding portion 171 and the second movable guiding portion 172 are combined with each other, the center line of the paired first pivots 171*j* are on the center line L1 about which the first movable guiding portion 171 rotates. That is, the center about which the paired first pivots 171*j* rotate and the center about which the paired second pivots 172*b* rotate are on the same axis. In other words, the second movable guiding portion 172 is supported so as to be rotatable about the center line L1 about which the first movable guiding portion 171 rotates.

As shown in FIG. 5, the ADF 1*x* includes a second spring 184. For example, the second spring 184 may be a torsion coil spring supported by one of the second pivots 172*b*. One end of the second spring 184 is engaged with an engagement portion 172*c* of the second movable guiding portion 172, and the other end of the second spring 184 is engaged with one of the extension portions, that is, the extension portion 171*c* of the first movable guiding portion 171.

The second spring 184 is an example of an elastic member that applies, to the second movable guiding portion 172, a force for rotating the second movable guiding portion 172 into the fourth posture. Elastic force of the second spring 184 is lower than elastic force of the first spring 181. The second spring 184 may be another kind of spring such as a tension coil spring.

As shown in FIG. 10, the second movable guiding portion 172 comes into contact with the document 9 conveyed in the forward direction by the second conveying roller pairs 122. The second movable guiding portion 172 rotates by a force received from the document 9 against a force of the second spring 184 from the fourth posture into the third posture. Therefore, a driving source such as a motor for rotating the second movable guiding portion 172 is unnecessary.

Further, as shown in FIG. 9, the second spring 184 elastically prompts the second movable guiding portion 172 toward a regulation portion 172*d* that is a part of the first movable guiding portion 171. That is, the second movable guiding portion 172 is brought into pressure contact with the first movable guiding portion 171 by the second spring 184 in the fourth posture. The regulation portion 172*d* regulates a rotation range in the direction in which the second movable guiding portion 172 is prompted by the second spring 184. Thus, in a state where external force except for the elastic force of the second spring 184 is not applied to the second movable guiding portion 172, when the first movable guiding portion 171 is rotated, the second movable guiding portion 172 is rotated integrally with the first movable guiding portion 171.

Therefore, without providing a driving source for the second movable guiding portion 172, by controlling the posture of the first movable guiding portion 171, the posture of the second movable guiding portion 172 can be controlled.

[Structure of Third Movable Guiding Portion 173]

As shown in FIG. 9, the third movable guiding portion 173 has a third base portion 173*a* formed along the width direction of the second conveying path 102, and paired third pivots 173*b* formed at both end portions of the third base portion 173*a*. In FIG. 9, one of the third pivots 173*b* is represented by an imaginary line.

The third base portion 173*a* has a third path changing portion 173*g*, a fourth path one-surface guiding portion 173*i*, and a fifth path one-surface guiding portion 173*h* formed therein. The third path changing portion 173*g* rotates at the third diverging position P3 and changes a direction in which the document 9 is conveyed. The third path changing portion 173*g* is the end portion of the third movable guiding portion 173.

The fourth path one-surface guiding portion 173*i* guides one surface of the document 9 conveyed along the fourth conveying path 104. The fifth path one-surface guiding portion 173h guides one surface of the document 9 conveyed in the opposite direction along the second conveying path 102.

The paired third pivots 173b are rotatably supported by the paired support members 12a on both sides of the second conveying path 102. That is, the third movable guiding portion 173 is supported by the paired support members 12a so as to be rotatable between the fifth posture and the sixth posture.

As described above, the second movable guiding portion 172 is rotatably supported at both end portions thereof by the first movable guiding portion 171. Therefore, if the first diverging position P1 and the second diverging position P2 are close to each other, the first movable guiding portion 171 and the second movable guiding portion 172 for changing the direction in which the document 9 is conveyed, are prevented from interfering with each other in portions supported by the paired support members 12a. As a result, the size of the ADF 1x can be reduced.

Further, the second movable guiding portion 172 is supported so as to be rotatable about the center line L1 about which the first movable guiding portion 171 rotates. In this case, the second movable guiding portion 172 is not influenced by rotation of the first movable guiding portion 171. As a result, a mechanism for allowing the first movable guiding portion 171 and the second movable guiding portion 172 to independently operate can be implemented by a simple structure.

Further, the paired extension portions 171b, 171c contribute to increase of a range in which the first path-changing portion 171g rotates while reducing the size of the first base portion 171a. Further, a part of the second movable guiding portion 172 is in a space between the paired extension portions 171b, 171c. Therefore, the first movable guiding portion 171 and the second movable guiding portion 172 can be accommodated in a narrow space.

Moreover, in the present embodiment, the first guiding portion 171h and the second guiding portion 171i that are each a part of the first movable guiding portion 171 double as members that form a part of the first conveying path 101 and a part of the second conveying path 102. Therefore, in the ADF 1x, members for forming the first conveying path 101 and the second conveying path 102 are simplified.

Similarly, the fourth guiding portion 172i that is a part of the second movable guiding portion 172 doubles as a member for forming a part of the third conveying path 103. Therefore, in the ADF 1x, a member for forming the third conveying path 103 is simplified.

The end portion of the document 9 that is conveyed in the forward direction along the second conveying path 102 comes into contact with the third guiding portion 172h and slides. Therefore, the second movable guiding portion 172 does not impair the document 9 that is conveyed in the forward direction in the second conveying path 102.

Further, the third conveying path 103 merges at the first merging position P4 in the first conveying path 101. Therefore, the size of the ADF 1x can be reduced as compared to a case where discharge openings for the document 9 are individually formed at the outlet of the first conveying path 101 and the outlet of the third conveying path 103.

Application Example

The first movable guiding portion 171 and the second movable guiding portion 172 in the ADF 1x as described above may be applied also to an apparatus that conveys the output sheet 90.

Further, the sheet conveying apparatus and the image reading apparatus according to the present disclosure, can be implemented by optionally combining the embodiments and the application example as described above, or by modifying or partially omitting the embodiments and the application example as appropriate within the scope of the disclosure defined by claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet conveying apparatus comprising:
support members;
a sheet supply portion from which a sheet is fed;
a sheet discharge portion into which the sheet is discharged;
a switch-to-back portion configured to reverse a sheet conveying direction of the sheet being conveyed;
a first sheet conveying path where the sheet is conveyed from the sheet supply portion toward the sheet discharge portion;
a second sheet conveying path configured to connect with the switch-to-back portion and a first diverging position in the first sheet conveying path, wherein the sheet is conveyed from the first diverging position toward the switch-to-back portion;
a third sheet conveying path that is a conveying path for the sheet that is reversed and conveyed by the switch-to-back portion, the third sheet conveying path reaching a merging position that is closer to the sheet discharge portion than the first diverging position in the first sheet conveying path is;
a first movable guiding portion having both end portions in a width direction orthogonal to the sheet conveying direction, the both end portions being rotatably supported by the support members, the first movable guiding portion configured to be rotatable between a first posture in which the sheet that has been conveyed along the first sheet conveying path is guided, at the first diverging position, toward the sheet discharge portion, and a second posture in which the sheet is guided into the second sheet conveying path; and
a second movable guiding portion having both end portions, in the width direction, which are rotatably supported by the first movable guiding portion, the second movable guiding portion configured to be rotatable between a third posture in which, at a second diverging position in the second sheet conveying path, the second sheet conveying path is formed in conjunction with the first movable guiding portion in the second posture, and a fourth posture in which the third sheet conveying path is formed at the second diverging position, wherein the first movable guiding portion includes
a first base portion, formed so as to extend in the width direction, configured to come into contact with the sheet,
side end portions provided at both ends, in the width direction, of the first base portion, and
first pivots that are formed in the side end portions, respectively, so as to project outward in the width direction, and that are rotatably supported by the support members, and the second movable guiding portion includes a second base portion, formed so as to extend in the width direction, configured to come into contact with the sheet, and second pivots disposed at both ends, respectively, in the width direction, of the second base portion, the second pivots being rotatably supported by bearing portions formed on the side end portions, respectively.

2. The sheet conveying apparatus according to claim 1, wherein the first pivots and the second pivots are on the same axis.

3. The sheet conveying apparatus according to claim 1, wherein the side end portions are disposed upright at both ends, in the width direction, of the first movable guiding portion, and the second movable guiding portion is disposed in a space between the side end portions.

4. The sheet conveying apparatus according to claim 1, wherein at least one of the second pivots has a flattened shape, at least one of the bearing portions of the side end portions has a pivot hole portion that holds a corresponding one of the second pivots, and a slit that is in communication with the pivot hole portion and has a width less than the pivot hole portion, and the width, in a major diameter direction, of the flattened shape is greater than the width of the slit, and the width thereof in a minor diameter direction is less than the width of the slit.

5. The sheet conveying apparatus according to claim 1, wherein the first base portion includes a first guiding portion configured to guide, along the first sheet conveying path, the sheet having passed through the first diverging position along the first sheet conveying path in the first posture, and a second guiding portion configured to guide, along the second sheet conveying path, the sheet having entered the second sheet conveying path through the first diverging position in the second posture, and the second base portion includes a third guiding portion configured to guide the sheet conveyed from the first diverging position, toward the switch-to-back portion, in conjunction with the second guiding portion, in the third posture, and a fourth guiding portion configured to guide, along the third sheet conveying path, the sheet reversed and conveyed by the switch-to-back portion, in the fourth posture.

6. An image reading apparatus comprising:

the sheet conveying apparatus according to claim 1; and an image reading portion configured to read an image from a sheet conveyed by the sheet conveying apparatus.

7. A sheet conveying apparatus comprising:

support members;

a sheet supply portion from which a sheet is fed;

a sheet discharge portion into which the sheet is discharged;

a switch-to-back portion configured to reverse a sheet conveying direction of the sheet being conveyed;

a first sheet conveying path where the sheet is conveyed from the sheet supply portion toward the sheet discharge portion;

a second sheet conveying path configured to connect with the switch-to-back portion and a first diverging position in the first sheet conveying path, wherein the sheet is conveyed from the first diverging position toward the switch-to-back portion;

a third sheet conveying path that is a conveying path for the sheet that is reversed and conveyed by the switch-to-back portion, the third sheet conveying path reaching a merging position that is closer to the sheet discharge portion than the first diverging position in the first sheet conveying path is;

a first movable guiding portion having both end portions in a width direction orthogonal to the sheet conveying direction, the both end portions being rotatably supported by the support members, the first movable guiding portion configured to be rotatable between a first posture in which the sheet that has been conveyed along the first sheet conveying path is guided, at the first diverging position, toward the sheet discharge portion, and a second posture in which the sheet is guided into the second sheet conveying path;

a second movable guiding portion having both end portions, in the width direction, which are rotatably supported by the first movable guiding portion, the second movable guiding portion configured to be rotatable between a third posture in which, at a second diverging position in the second sheet conveying path, the second sheet conveying path is formed in conjunction with the first movable guiding portion in the second posture, and a fourth posture in which the third sheet conveying path is formed at the second diverging position; and an elastic member configured to apply, to the second movable guiding portion, a force for rotating the second movable guiding portion into the fourth posture, wherein the second movable guiding portion comes into contact with the sheet conveyed toward the switch-to-back portion, to rotate, against a force of the elastic member, from the fourth posture into the third posture.

8. The sheet conveying apparatus according to claim 7, wherein the second movable guiding portion is brought into pressure contact with the first movable guiding portion by the elastic member in the fourth posture, and the second movable guiding portion rotates integrally with the first movable guiding portion when the first movable guiding portion rotates.

9. An image reading apparatus comprising:

the sheet conveying apparatus according to claim 7; and an image reading portion configured to read an image from a sheet conveyed by the sheet conveying apparatus.

10. A sheet conveying apparatus comprising:

support members;

a sheet supply portion from which a sheet is fed;

a sheet discharge portion into which the sheet is discharged;

a switch-to-back portion configured to reverse a sheet conveying direction of the sheet being conveyed;

a first sheet conveying path where the sheet is conveyed from the sheet supply portion toward the sheet discharge portion;

a second sheet conveying path configured to connect with the switch-to-back portion and a first diverging position in the first sheet conveying path, wherein the sheet is conveyed from the first diverging position toward the switch-to-back portion;

a third sheet conveying path that is a conveying path for the sheet that is reversed and conveyed by the switchto-back portion, the third sheet conveying path reaching a merging position that is closer to the sheet discharge portion than the first diverging position in the first sheet conveying path is;

a fourth sheet conveying path diverging from the switch-to-back portion at a third diverging position in the second sheet conveying path, and reaching, from the switch-to-back portion, a second merging position which is located upstream of the first diverging position in the first sheet conveying path, in the sheet conveying direction;

a first movable guiding portion having both end portions in a width direction orthogonal to the sheet conveying direction, the both end portions being rotatably supported by the support members, the first movable guiding portion configured to be rotatable between a first posture in which the sheet that has been conveyed along the first sheet conveying path is guided, at the first diverging position, toward the sheet discharge portion, and a second posture in which the sheet is guided into the second sheet conveying path;

a second movable guiding portion having both end portions, in the width direction, which are rotatably supported by the first movable guiding portion, the second movable guiding portion configured to be rotatable between a third posture in which, at a second diverging position in the second sheet conveying path, the second sheet conveying path is formed in conjunction with the first movable guiding portion in the second posture, and a fourth posture in which the third sheet conveying path is formed at the second diverging position; and a third movable guiding portion disposed between the second movable guiding portion and the third diverging position, and supported so as to be rotatable between a fifth posture and a sixth posture, wherein the third movable guiding portion in the fifth posture connects the second sheet conveying path and the switch-to-back portion with each other, and the third movable guiding portion in the sixth posture closes the third sheet conveying path and connects the switch-to-back portion and the fourth sheet conveying path with each other.

11. An image reading apparatus comprising:
the sheet conveying apparatus according to claim 10; and
an image reading portion configured to read an image from a sheet conveyed by the sheet conveying apparatus.

* * * * *